(12) United States Patent
Wiswell

(10) Patent No.: X7535
(45) Date of Patent: Apr. 12, 1833

(54) WHEELS, SPOKES FOR

(76) Inventor: Daniel H. Wiswell

The Schedule referred to in these Letters Patent, and making part of the same, containing
a description in the words of the said Daniel H. Wiswell himself of his Improvement being a machine for
making Spokes for wheels.

Be it known, that I, Daniel H. Wiswell, of Petersham, in the County of Worcester, and State of Massa-
-chusetts, have made an improvement in the useful arts, being a machine for making spokes for wheels.
which is described as follows -

This machine consists of the following principal parts, viz. - The frame which supports and incloses the
machinery: - the wheel for cutting the tenon, and the wheel for rounding the edges of the spoke: - the carriage
and rack which carries the spoke to the wheel for dressing the edges: the arbor with the spiral worm
which works in the rack of the carriage: the weight or spring for drawing back the carriage - circular
saws for dressing the timbers; and the gearing by which the machinery is moved.

The frame is adapted in size and strength to the machinery to be inclosed and supported, and
is constructed by mortising and tenoning together, about six posts, four side pieces or girths, two end
pieces and a girth or cross piece -

The wheel for cutting the tenon is made of cast iron, about 15 inches diameter, with a groove in the
edge of it, to receive four or more cutters.

The wheel for dressing the edges of the spoke, is of the same size as that before described, having
also four or more cutters, of the figure, slope, or inclination of the front of the spoke. When the front
and back of the spoke are required to be made of different shapes, then another wheel is added,
with a similar groove, to receive cutters for rounding the back of the spoke to the figure required;
or an additional groove may be made in the wheel before described for that purpose, the wheel
in that case must be made broader.

Two circular saws for dressing the timbers for the spokes are placed parallel to each other and
upon the same axle or arbor which turns the before described wheels. -

The carriage and rack which carries the spoke to the wheel to be dressed is placed below
the before mentioned wheels. The carriage is moved by an arbor with a spiral screw on one end
working into the rack on the [illegible] of the carriage. The same arbor rests with one end upon a movable
bar turning on a pin or pivot, to which is attached a [illegible] for moving it up and down; and by which the same
arbor is put in and out of gear with the rack below the carriage. The other end turns in a box fixed
[illegible] permanent cross piece of the frame, [illegible] of the shaft [illegible] beyond [illegible]
[illegible] wheel [illegible] spring [illegible] to the end of the [illegible]

support the screw arbor for putting it in and out of gear. A small pin on the side of the carriage
lets off the spring-catch which suffers the end of the screw arbor to drop, and throw it out of gear,
and by pressing down the before mentioned lever attached to the bar below, it is raised, and
the screw arbor put in gear.—

A weight attached to a cord passing over a pulley, and fastened to the carriage, brings
it back again, when the operation of dressing the spoke is performed.

The gearing. A wheel of a suitable size having a groove in it is fixed near the end of the
machine, supported on the frame. On its arbor is a bevel wheel working into the one before men-
tioned placed on the arbor which carries the spiral screw working into the rack. A wheel
is placed on the end of the axle which carries the dressing saws and the cutters, and a band
passes round this wheel and that which drives the arbor for moving the rack. Motion is
given to the machinery by the hand or any other power.

Operation. The timber for the spoke is first dressed to its proper thickness by the circular
saws:—the tenon is then formed by the cutters in the groove of the tenon cutting wheel:— the
spoke is then removed and placed upon the carriage; one end resting against a pin and
supported by a wedge; and screwed fast at the other: when the front edges are dressed by
the cutters it is turned and the back edges dressed either by the same cutters, or others put upon
another wheel, when intended to be of a different thickness and shape.—

The invention here claimed and desired to be secured by Letters Patent consists of the whole of the
before described machine, when taken together; particularly the wheel of cutters for dressing the
edges of the spoke:—but no claim is made to circular saws, the gearing, tenoning wheel and other
parts before described taken separately.

For a further illustration of my invention, I refer to the model and drawing of the same deposited
in the Patent Office.

In testimony whereof I have hereunto subscribed my name this 6th day of April 1833.

Daniel H. Winsell

Witnesses
William P. Elliot
Will: Robb;

970 words

Exd. [illegible]

(Patented April 12. 1833)